(No Model.) 2 Sheets—Sheet 1.
T. B. VERNON.
APPARATUS FOR KEEPING LETTERS OR OTHER DOCUMENTS.
No. 602,116. Patented Apr. 12, 1898.
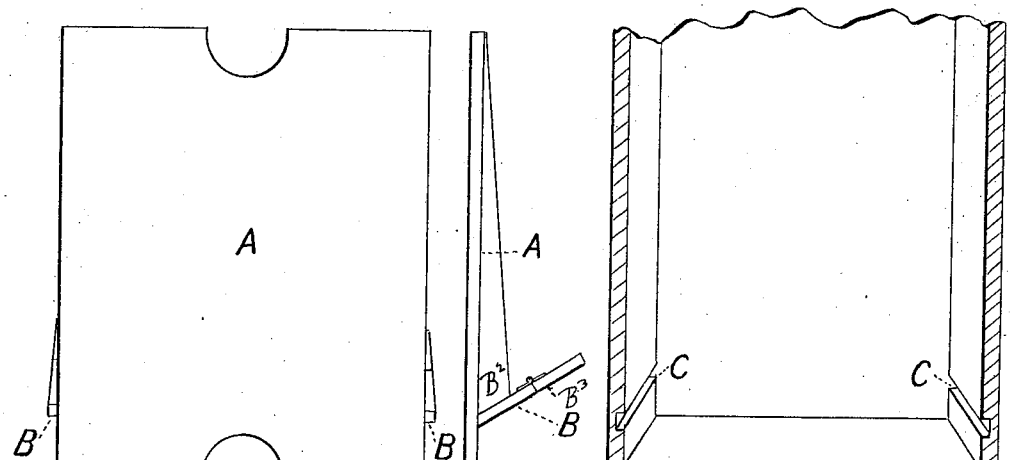
FIG. 1.  FIG. 2.  FIG. 3.
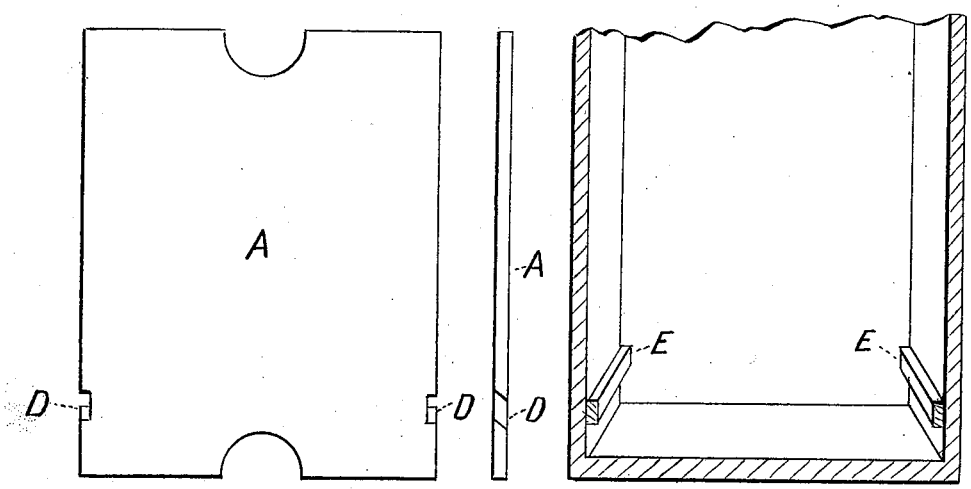
FIG. 4.  FIG. 5.  FIG. 6.
Witnesses:
E. B. Bolton
E. K. Sturtevant
Inventor:
Thomas Bawater Vernon
By 
his Attorneys.

(No Model.) 2 Sheets—Sheet 2.
T. B. VERNON.
APPARATUS FOR KEEPING LETTERS OR OTHER DOCUMENTS.
No. 602,116. Patented Apr. 12, 1898.
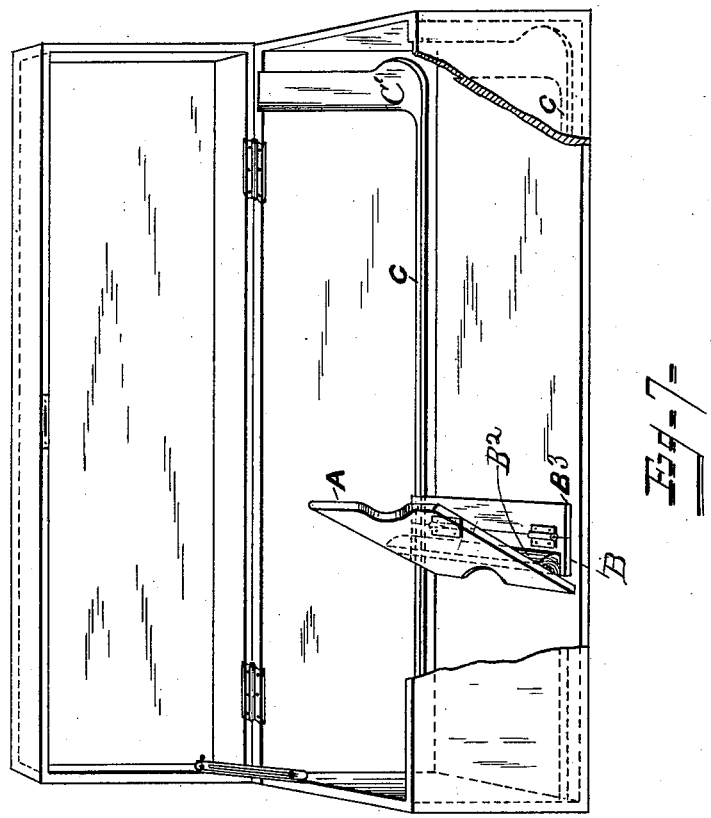
Witnesses:
H. van Oldenneel
E. A. Scott.
Inventor
Thomas B. Vernon
By his Attorneys Richards

UNITED STATES PATENT OFFICE.

THOMAS BOWATER VERNON, OF WALLINGTON, ENGLAND.

APPARATUS FOR KEEPING LETTERS OR OTHER DOCUMENTS.

SPECIFICATION forming part of Letters Patent No. 602,116, dated April 12, 1898.

Application filed May 31, 1893. Serial No. 476,055. (No model.) Patented in England January 15, 1891, No. 793.

*To all whom it may concern:*

Be it known that I, THOMAS BOWATER VERNON, gentleman, a British subject, residing at Hanbury Manor Road, Wallington, in the county of Surrey, England, have invented an Improved Apparatus for Keeping Letters or other Documents; and I do hereby declare the following to be a full, clear, and exact description of the invention, reference being had to the accompanying drawings, which form part of this specification.

This invention has been patented in Great Britain, No. 793 of January 15, 1891.

My invention is essentially an improved apparatus for keeping letters and other documents so that they can be easily put away, referred to, or taken out, as required. The documents are supported by an inclined slide moving in grooves or on projections on the sides of the drawers or other receptacles, so that the weight of the documents tends to hold the said slide fast; but it is easily moved either way by pressure applied parallel to the grooves. The documents may be supported by any other similar contrivance. I thus dispense with all cumbersome apparatus for holding together the documents, and there is no need with my invention to unlock or otherwise loosen the documents in order to be able to refer to or take them out.

Figure 1 is a front elevation of the sliding piece. Fig. 2 is a side elevation of the same. Fig. 3 is a sectional perspective view of part of the box or drawer, showing grooves in the sides for sliding piece to run in. Figs. 4 and 5 show a modified form of sliding plate having inclined grooves in its edges. Fig. 6 is a sectional view of a box adapted to receive the sliding piece of Figs. 4 and 5. Fig. 7 is a perspective view of the slide applied to a box.

As shown in Figs. 1, 2, and 7, a slide A is provided, arranged in an inclined position and having an extension B projecting from its rear face and substantially parallel to the bottom of the box or receptacle. This extension has its ends projecting beyond the ends of the slide A, so as to enter grooves C in the walls of the receptacle and thus guide and support the slide. The extension has a fixed part $B^2$ and a hinged portion $B^3$ to allow of the ready removal of the slide, as shown in Fig. 7, the ways or grooves being enlarged for this purpose at one end, as at $C'$.

As shown in Figs. 4, 5, and 6, instead of providing the walls of the receptacle with grooves strips E may project therefrom, coacting with grooves D in the part A.

In all the ways shown the weight of the documents tends to hold fast the sliding piece A, and therefore the employment of any locking or clamping apparatus is unnecessary; but as pressure applied to the lower part of the sliding piece A will move it easily any document can be easily taken out for reference without disturbing the order of the rest of the documents. Any suitable means may be employed of indicating the arrangement of the documents. It is obvious that no rearrangement is required by the use of my method whatever the increase in the number of documents may be.

I claim—

In combination with a box or drawer, a movable support, permanently inclined, guides therefor, and a hinged guiding-piece $B^3$ extending from the rear of the movable support, substantially as described.

In witness whereof I have hereunto set my hand in presence of two witnesses.

THOMAS BOWATER VERNON.

Witnesses:
 WILLIAM HENRY MUNNS,
 JOHN WILLOUGHBY MUNNS.